US010969506B1

(12) United States Patent
Noll et al.

(10) Patent No.: US 10,969,506 B1
(45) Date of Patent: Apr. 6, 2021

(54) SYSTEM AND METHODS FOR DETECTING GUNSHOTS

(71) Applicant: Soundco Limited LLC, Worthington, OH (US)

(72) Inventors: Scott Noll, Blacklick, OH (US); Joseph Plattenburg, Hilliard, OH (US); Vadim Barash, New Albany, OH (US)

(73) Assignee: Soundco Limited LLC, Worthington, OH (US)

( * ) Notice: Subject to any disclaimer, the term of this patent is extended or adjusted under 35 U.S.C. 154(b) by 0 days.

(21) Appl. No.: 16/510,903

(22) Filed: Jul. 13, 2019

Related U.S. Application Data

(60) Provisional application No. 62/698,258, filed on Jul. 15, 2018.

(51) Int. Cl.
| | |
|---|---|
| *H04R 29/00* | (2006.01) |
| *G01V 1/00* | (2006.01) |
| *G01S 7/539* | (2006.01) |
| *G01S 15/04* | (2006.01) |
| *G01S 19/18* | (2010.01) |

(52) U.S. Cl.
CPC ............. *G01V 1/001* (2013.01); *G01S 7/539* (2013.01); *G01S 15/04* (2013.01); *G01S 19/18* (2013.01); *H04R 29/00* (2013.01); *H04R 29/007* (2013.01)

(58) Field of Classification Search
CPC ....... G10L 21/034; G10L 19/02; G10L 15/28; G10L 25/18; G10L 25/48; G10L 25/51; H04R 29/00; H04R 29/007; H04R 29/008

USPC .................................. 381/56–58, 77, 79–80
See application file for complete search history.

(56) References Cited

U.S. PATENT DOCUMENTS

| | | | |
|---|---|---|---|
| H1916 H | 11/2000 | Hollander | |
| 6,847,587 B2 | 1/2005 | Patterson | |
| 7,599,252 B2 | 10/2009 | Showen et al. | |
| 9,380,397 B2 | 6/2016 | Kane et al. | |
| 10,694,107 B2 * | 6/2020 | Orglmeister | ........... A62C 37/04 |
| 2005/0105743 A1 * | 5/2005 | Faltesek | ................ G08B 17/00 |
| | | | 381/82 |
| 2015/0066495 A1 * | 3/2015 | Zhang | .................... G10L 15/02 |
| | | | 704/231 |
| 2015/0070166 A1 * | 3/2015 | Boyden | .............. G08B 13/1672 |
| | | | 340/540 |
| 2015/0371638 A1 * | 12/2015 | Ma | ......................... G10L 15/28 |
| | | | 704/275 |

FOREIGN PATENT DOCUMENTS

| | | | |
|---|---|---|---|
| WO | WO2000073811 A1 | 12/2000 | |
| WO | WO2004068162 A2 | 8/2004 | |

* cited by examiner

*Primary Examiner* — Disler Paul
(74) *Attorney, Agent, or Firm* — Katterle Nupp LLC; Paul Katterle; Robert Nupp (57) ABSTRACT

Disclosed herein are systems, methods, apparatus, and non-transitory computer-readable storage media for detecting gunshots with improved accuracy. The system includes a plurality of acoustic sensing devices having intelligent modules for distinguishing gunshot events from other types of acoustic events.

9 Claims, 5 Drawing Sheets

SYSTEM AND METHODS FOR DETECTING GUNSHOTS

CROSS REFERENCE TO RELATED APPLICATIONS

This disclosure claims the benefit of priority under 35 U.S.C. § 119(e) to the following application, the contents of which is hereby incorporated by reference in its entirety: U.S. Provisional Patent Application No. 62/698,258, filed Jul. 15, 2018, entitled SYSTEM AND METHODS FOR DETECTING GUNSHOTS.

TECHNICAL FIELD

The present disclosure relates generally to improved systems, apparatus, methods and non-transitory computer-readable storage media for detecting acoustic events. More specifically, but not in a limiting sense, the present disclosure relates to systems and methods for detecting gunshots and identifying them as gunshots with improved accuracy and alerting one or more remote host systems of the detected gunshots.

BACKGROUND

In general, it is believed that a major trauma victim's probability of surviving a traumatic injury and reaching a better outcome increases as the time-delay in providing the victim critical care decreases. In fact, evidence suggests that mortality is decreased in trauma patient outcomes when the trauma patient reaches definitive care (e.g., surgery) within about one hour of the traumatic injury (e.g., a gunshot wound). Colloquially, the first hour of time after a major injury is incurred is sometimes known as the "golden hour."

Gunshots may occur in acoustic environments having a wide variety and range of complexities—from relatively simple environments (e.g., open spaces with little reflectance and little interfering sounds) to relatively complex environments (e.g., closed spaces with many reflecting surfaces and/or areas having a high incidence of overlapping sounds such as human and automobile traffic noise, industrial equipment noises, etc). In some cases, overlapping sounds may have the quality of a gunshot (e.g., a firecracker, a drill, etc.).

There is therefore a need for a relatively simple, effective way to detect acoustic events, such as gunshots, in different environments and identify them with a high degree of accuracy and to provide relevant alerts when an acoustic event is so detected.

BRIEF DESCRIPTION OF THE DRAWINGS

The present disclosure, in accordance with one or more various embodiments, is described in detail with reference to the following drawings. The drawings are provided for purpose of illustration only and merely depict aspects of typical or example embodiments. These drawings are provided to facilitate the reader's understanding of the disclosure and shall not be considered limiting of the breadth, scope, or applicability of the disclosure.

The components in the drawing are not necessarily drawn to scale. In the drawings, like reference numerals designate corresponding parts throughout the several views. One of ordinary skill in the art will appreciate that a component may be designed as multiple components or that multiple components may be designed as a single component. It should be appreciated that the drawings use conventional symbols, showing only those details that are pertinent to understanding the embodiments herein so as not to obscure the disclosure with details that will be apparent one or ordinary skill in the art having the benefit of the description herein.

DESCRIPTION

The present disclosure describes and illustrates one or more novel embodiments of systems, apparatus, methods, and non-transitory computer-readable storage media for detecting acoustic events. In one or more embodiments, the systems, apparatus and methods are configured (in hardware and/or software) such that the acoustic event that is detected is one or more gunshots. It should be understood that aspects, features or functions that are described in relation to an embodiment are not necessarily limited to the embodiment described, but rather may be applicable to one or more embodiments, unless expressly described otherwise. Also, the description set forth herein is not to be construed as limited to the embodiments shown. Rather, it is appreciated that various modifications may occur to those skilled in the art that, while not specifically set forth herein, are nevertheless within the spirit and scope of the description. When an embodiment is described as "exemplary" (or similarly) herein, it is to be understood as one non-limiting example embodiment and does not preclude other embodiments that may not include the limitations described in the exemplary embodiment.

As may be appreciated by one of skill in the art, aspects of the embodiments described herein may be employed as a system, method or computer program product. Accordingly, aspects may take the form of a hardware embodiment, a software embodiment (including firmware, etc.) or an embodiment combining hardware and software that may all generally be referred to herein as a "module," "component," or "system." Further, aspects of the disclosed embodiments may take the form of a computer program product embodied in one or more computer readable medium(s) having computer readable program code represented thereon.

Also as may be appreciated by one of skill in the art, aspects of the embodiments described herein as functions, algorithms or methods may be implemented in software. The software may comprise computer executable instructions stored on computer readable media. Multiple functions may be performed in one or more modules as desired, and the embodiments described are merely examples. The software may be executed on a digital signal processor, ASIC, microprocessor, microcontroller, system on chip, or other type of processor operating on a computing system, such as a personal computer, server or other type of computer.

Figure 1:
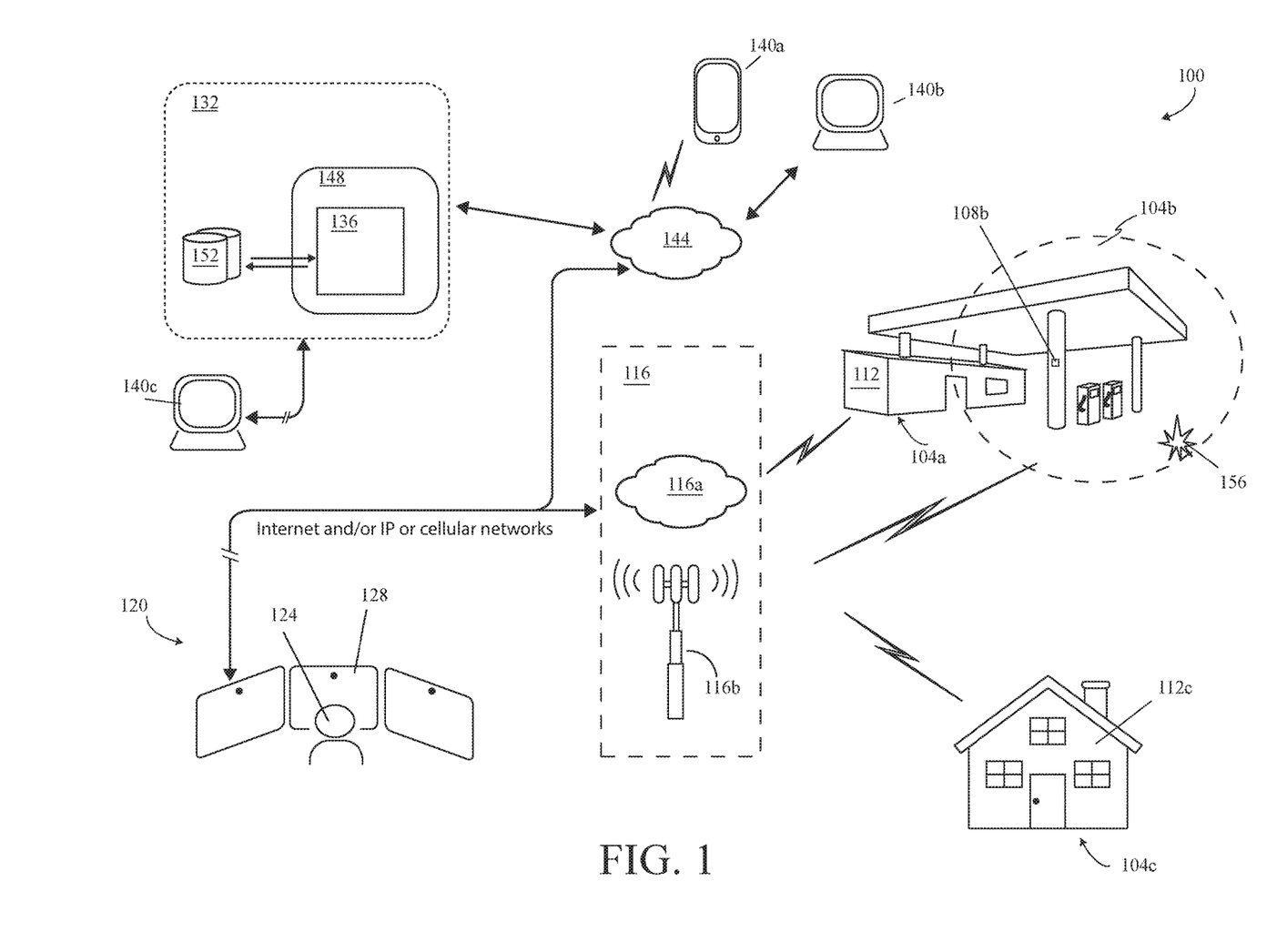
FIG. 1 is a high-level schematic diagram illustrating an embodiment of a gunshot detection system and exemplary processing environment, in accordance with one or more aspects and implementations described herein.

With reference to FIG. 1, one embodiment of a gunshot detection system 100 is shown according to various aspects described herein. System 100 generally may include one or more coverage areas 104*a-c* and one or more acoustic sensing devices 108*a-c* (described more fully below in relation to FIG. 2), wherein each coverage area 104 is characterized by an acoustic sensing device 108. A coverage area, such as coverage area 104, is any three-dimensional space that is actively and effectively monitored by an acoustic sensing device as described herein. In general, the boundary of any given coverage area may depend on such factors as the physical and/or acoustic environment within which the relevant acoustic sensing device is deployed, as well as the acoustic sensing device's hardware and/or software (including configured settings), among other factors. For example, if an acoustic sensing device is located within a structure, such as a commercial office and/or office building or a residential home, the coverage area for that device is affected by, and in many instances limited to being within, the walls of the structure. By way of another example, if an acoustic sensing device is located within a large structure (e.g., a large warehouse), the coverage area for that device in some embodiments may be limited to a portion of the interior space of that structure (i.e., a plurality of devices/coverage areas may be located within such structure).

With continuing reference to FIG. 1, acoustic sensing device 108*a* (not shown) is deployed inside structure 112*a* (shown here as, e.g., a single-story gas station building), while acoustic sensing device 108*b* is deployed in an outdoor environment (shown here as, e.g., the outdoor environment adjacent gas station structure 112*a*). Acoustic sensing device 108*c* (not shown) is deployed inside structure 112*c* (shown here as, e.g., a residential structure). As illustrated, then, coverage area 104*a* comprises the interior of gas station structure 112*a*, while coverage area 104*b* comprises the outside space in the immediate vicinity of gas station structure 112*a*. Also, as shown, coverage area 104*c* comprises the interior of residence 112*c*.

With continuing reference to FIG. 1, each acoustic sensing device 104 is configured to communicate messages and data to and/or from one or more remote monitoring stations, illustrated here by monitoring station 120 via one or more networks 116. In general, network 116 may be any suitable network(s) sufficient to support the functionality of the systems described herein. For example, in one or more embodiments network 116 may comprise one or more carrier cellular networks (represented in FIG. 1 by cell tower 116*b*). In other embodiments, network(s) 116 may be generally any suitable public or private network(s) (represented in FIG. 1 by network cloud 116*a*), such as the Internet.

Note that the embodiments described herein are not intended to be limited to any particular network or network architecture unless expressly stated otherwise. In one non-limiting example, network 116 may include one or more third-party network operating centers (not shown) configured to provide network services such as device authentication and secure routing of messages to and/or from remote monitoring station 120. In one or more non-limiting examples, network 116 may encompass one or more local area networks, intranets, etc. on which devices 108 and/or remote monitoring stations 120 may reside before connecting to a backbone component portion (e.g., public Internet) of network 116. In one or more embodiments, network communications may be authenticated and/or encrypted using one or more suitable protocols.

In general, with continuing reference to FIG. 1, remote monitoring station 120 monitors for gunshot alerts originating from acoustic sensing devices 108. In one or more embodiments, in addition to gunshot alerts, remote monitoring station 120 may receive one or more types of messages from acoustic sensing devices 108, such as status messages and check-in messages. In one or more embodiments, remote monitoring station 120 buffers and stores alerts. In some embodiments, remote monitoring station 120 presents alerts as they are received such that a supervisor may evaluate the alert information in real time. In some embodiments, the supervisor is a human operator (shown in FIG. 1 as supervisor 124) and the alert information is presented visually on one or more screens 128. In other embodiments, the supervisor is artificial intelligence (not shown). In one or more embodiments, in addition to presenting alerts for supervisory evaluation, remote monitoring station 120 may also enable alert response automation or otherwise provide for suitable alert response with or without human intervention. For example, in one or more embodiments, remote monitoring station 120 may be configured to automatically alert local police and/or emergency medical service (e.g., EMS/EMT) personnel in proximity to the one or more acoustic sensing devices 108 that generated the gunshot alarm being responded to.

In general, remote monitoring station 120 may comprise any hardware and software sufficient to provide the functionality described herein. In some embodiments, remote monitoring station 120 may comprise one or more hardware-based stations capable of receiving alarms over private networks and configured to received gunshot alerts from acoustic sensing devices 108, and to present the alerts for viewing by personnel and/or be configured to automatically forward alert information to one or more of police or emergency medical service personnel who are local to the device 108 that sent the alert. In other embodiments, remote monitoring station 120 comprises a software-based station loaded onto a general host system, such as one or more general purposes machines (e.g., hardware or software servers) and associated database(s), output devices (e.g., monitors), etc. In other embodiments, the software-based station runs on cloud-based infrastructure.

With continuing reference to FIG. 1, primary application 136 is shown deployed in computing environment 132. Computing environment 132 is in data communication with one or more clients, two of which are illustrated by devices 140*a,b*, via network 144. In addition, a third client (140*c*) is illustrated in local data communication with computing environment 132—as would be the case, for example, if computing environment 132 and client 140*c* were connected via a LAN. Devices 140 may comprise a client browser application—e.g. Firefox®, Internet Explorer®, Chrome®, Safari® (not shown)—for accessing dynamic or static web pages and web page content, etc. Network 144 may generally be any type of network suitable for providing data communications between two machines, environments, devices, networks, etc., and in some embodiments described herein comprises an IP network such as the Internet. Computing environment 132 may comprise one or more dedicated host computers (local or remote) and software providing the various servers, databases, and the like, suitable to provide the services described herein. Alternatively, computing environment 132 may comprise a service provider environment such as cloud infrastructure, platform, and/or software providing the various resources (e.g., server, database, and the like) suitable to provide the services described herein.

With continuing reference to FIG. 1, in one or more exemplary embodiments, the following elements may be deployed on computing environment 132 (or distributed among a plurality of computing environments). Server 148 may comprise one or more servers (physical and/or virtual) sufficient to provide the functionality of the embodiments disclosed herein. For example, in one embodiment, server 148 may comprise IIS software in a .NET runtime implementing one or more web server and application server components, and any necessary backend or cross-cutting components to support such services as, e.g., security, authentication, messaging, data access, etc. In another embodiment, server 148 may comprise at least one application server and at least one web server.

Referring still to FIG. 1, server 148 hosts primary application 136. In an exemplary embodiment, primary application 136 may comprise a standard three-tier architecture, although any suitable application architecture is within the scope of these embodiments. In an exemplary embodiment, primary application 136 is an ASP.NET web application that serves dynamic and/or static web pages and content to clients 140, querying one or more databases 152 or other backend systems as necessary to serve the web pages and content. The database(s) 152 may be any database(s) sufficient to support the functionality of system 100, such as for example a relational database and/or a document-oriented database. In one or more exemplary embodiments, the database(s) 152 may include one or more SQL databases to store data such as acoustic sensor device registration information, acoustic sensor device configuration information, user profile information, and/or acoustic sensor device location information, and any other data and information sufficient to support the operation of system 100. In one or more embodiments, database 152 may also store gunshot event acoustic samples, non-gunshot event acoustic samples, and/or conditioned data sets. Hereinafter, the database(s) 152 shall be referred to singularly and collectively as the database 152. The database 152 is deployed in computing environment 132.

In one or more embodiments, primary application 136 may be configured to provide one or more end user interfaces that may present to and/or receive information from end users (e.g., purchasers or licensees) of acoustic sensing devices, such as devices 108. For example, in some embodiments primary application 136 presents one or more GUIs or screens on client devices 140 that contain one or more interface input elements configured to receive registration information (e.g., unique device identifier information, such as MAC address(es)), end user profile information, and/or account information relating to deployed device(s) of the user, such as location information of the deployed device.

In one or more embodiments, primary application 136 may be configured to provide one or more administrator interfaces that may present to and/or receive information and instructions from administrator users (e.g., super users, central administrators, etc). For example, in some embodiments primary application 136 presents one or more GUIs or screens on client devices 140 that contain one or more interface input elements configured to add, delete, or edit accounts or account information.

Figure 2:
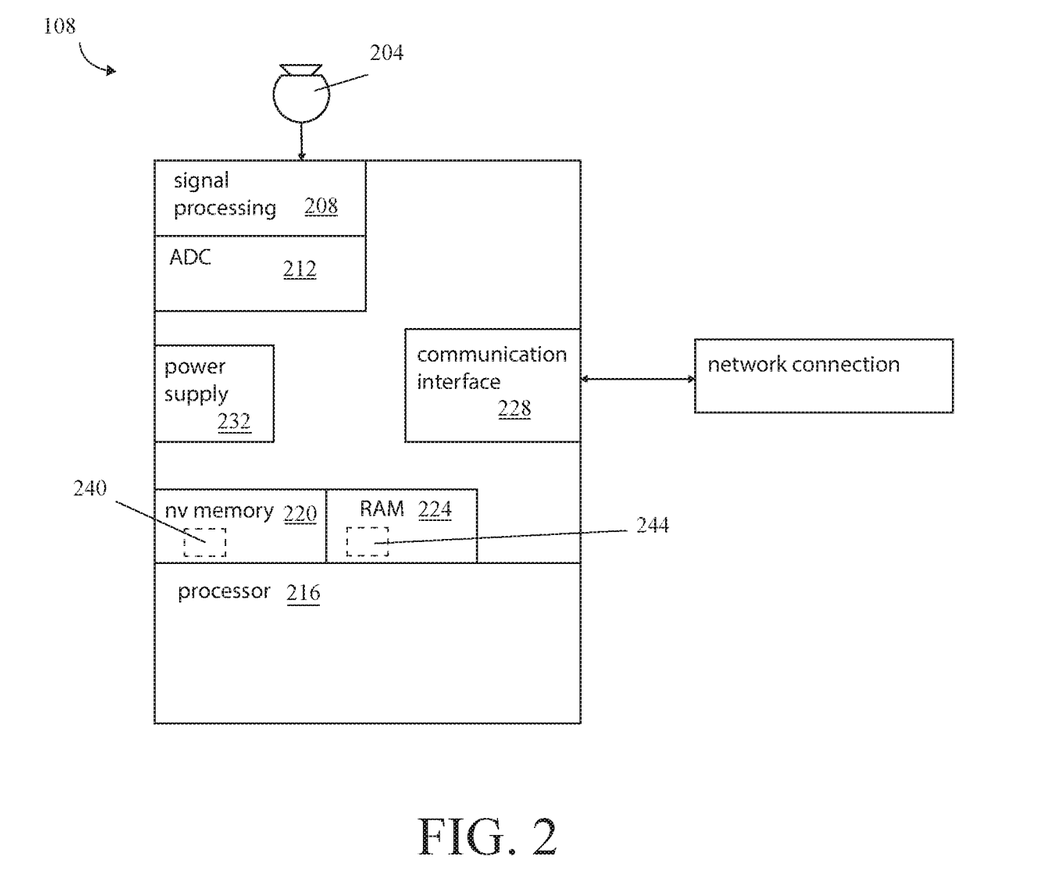
FIG. 2 is a block diagram illustrating an embodiment of an acoustic sensing device, in accordance with one or more aspects and implementations described herein.

Referring now to FIG. 2, a block diagram illustrating a non-limiting embodiment of an acoustic sensing device 108, in accordance with one or more aspects and implementations described herein, is shown. In general, acoustic sensing device 108 detects and samples sound in its acoustic environment and performs one or more evaluation operations on the sampled sound in order to positively identify acoustic events such gunshots with a relatively high degree of accuracy. In some embodiments, acoustic sensing device 108 is configured to alert a remote monitoring service when a gunshot is identified. In one or more embodiments, acoustic sensing device 108 is configured to detect and sample additional sound and store the sampled data locally when it identifies a gunshot and/or receives a request or instruction to collect sample data.

An acoustic sensing device may generally comprise any hardware and software components suitable to provide the functionality described herein. In one or more embodiments, an acoustic sensing device utilizes components mounted and/or integrated to a single board or circuit (as illustrated in FIG. 2) or common host device, while in other embodiments the constituent components may be mounted/integrated to a plurality of boards/circuits or host devices. With reference to FIG. 2, acoustic sensing device 108 may generally include microphone 204, signal processing circuitry 208, analog-to-digital converter (ADC) 212, processor 216, non-volatile memory 220 (e.g., flash memory), random access memory (RAM) 224, communication interface 228, and power supply 232. In the embodiment shown in FIG. 2, the constituent components are housed in a single unitary housing (not shown), although other embodiments contemplated herein may utilize more than a single unitary housing.

With continuing reference to FIG. 2, microphone 204 may comprise generally any suitable microphone sufficient to detect gunshots in the relevant coverage area (in its vicinity). In one or more embodiments, microphone 204 may comprise one or more condenser-type microphones (such as, e.g., electret microphones), piezoelectric-type microphones, acoustic wave sensors, and/or dynamic microphones. In some embodiments, microphone 204 is omnidirectional or directional (or an array of such microphones), depending in part on the needs of the end-use application and configuration. In one or more embodiments, device 108 includes a signal processing module(s) 208 (e.g., a preamplifier) and ADC 212 that are configured to receive analog signal(s) from microphone 204 and output a digital acoustic signal stream to processor 216.

Generally, processor 216 may be any processor(s) suitable to provide device 108 the functionality described herein, and in one or more embodiments comprises a commercially available microprocessor, microcontroller, DSP, and/or SoC. Processor 216 suitably executes instructions stored in memory 220, and is configured to perform, among other operations, digital signal acquisition and processing operations. In one or more embodiments, processor 216 comprises an ARM type processor and is configured to receive and store digital signal stream(s) from ADC 212 in buffer 244.

Device 108 includes non-volatile memory 220 and random access memory (RAM) 224. In general, non-volatile memory 220 may comprise ROM, EPROM, EEPROM, flash, etc. type memory, in such capacity and configuration as is suitable to provide the functions herein. In one embodiment, device 108 includes at least 2 GB of flash memory. In general, RAM 224 may be provided in any capacity and configuration as is suitable to provide the functions herein. In one embodiment, device 108 contains at least 512 MB of RAM 224 that is hard-wired to processor 216.

Buffer 244 may comprise generally any buffer type suitable for buffering the aforementioned digital acoustic signal stream. In one or more embodiments, buffer 244 is a software circular buffer described in more detail below.

In general, intelligent module 240 may comprise one or more software components or code (e.g., related functions, routines, etc.) (shown stored in non-volatile memory 220 in FIG. 2) that incorporate or otherwise embody one or more parameters, constants, equations, functions, or models, that have resulted from applying machine learning technique(s) on one or more data sets obtained or derived from actual events relevant to the acoustic event being monitored (e.g., gunshots). In one embodiment, intelligent module 240 comprises a trained logistic regression model, applied to a conditioned data set.

Power supply 232 may be generally any suitable internal or external power supply. In one or more examples, power supply 232 is a 5V micro-USB (external) power supply.

Communication interface 228 may include, for example, wired ethernet, WiFi, and cellular network interfaces. Cellular network interfaces may generally support any suitable cellular technology standard, such as CDMA, GSM, or LTE cellular networks. For example, in one or more embodiments, communication interface 228 comprises an LTE or an LTE Advanced modem. In one non-limiting embodiment, the communication interface is an LTE modem that may transmit and receive data to/from remote monitoring station 120 using an LTE NAS control channel as a part of a data service provided by a provider of the network. In such an embodiment, the transported data is typically small, such as 256 bytes or less).

Device 108 may include one or more external interface ports, such as USB ports (not shown), for mounting peripherals, such as USB drives.

Figure 3:
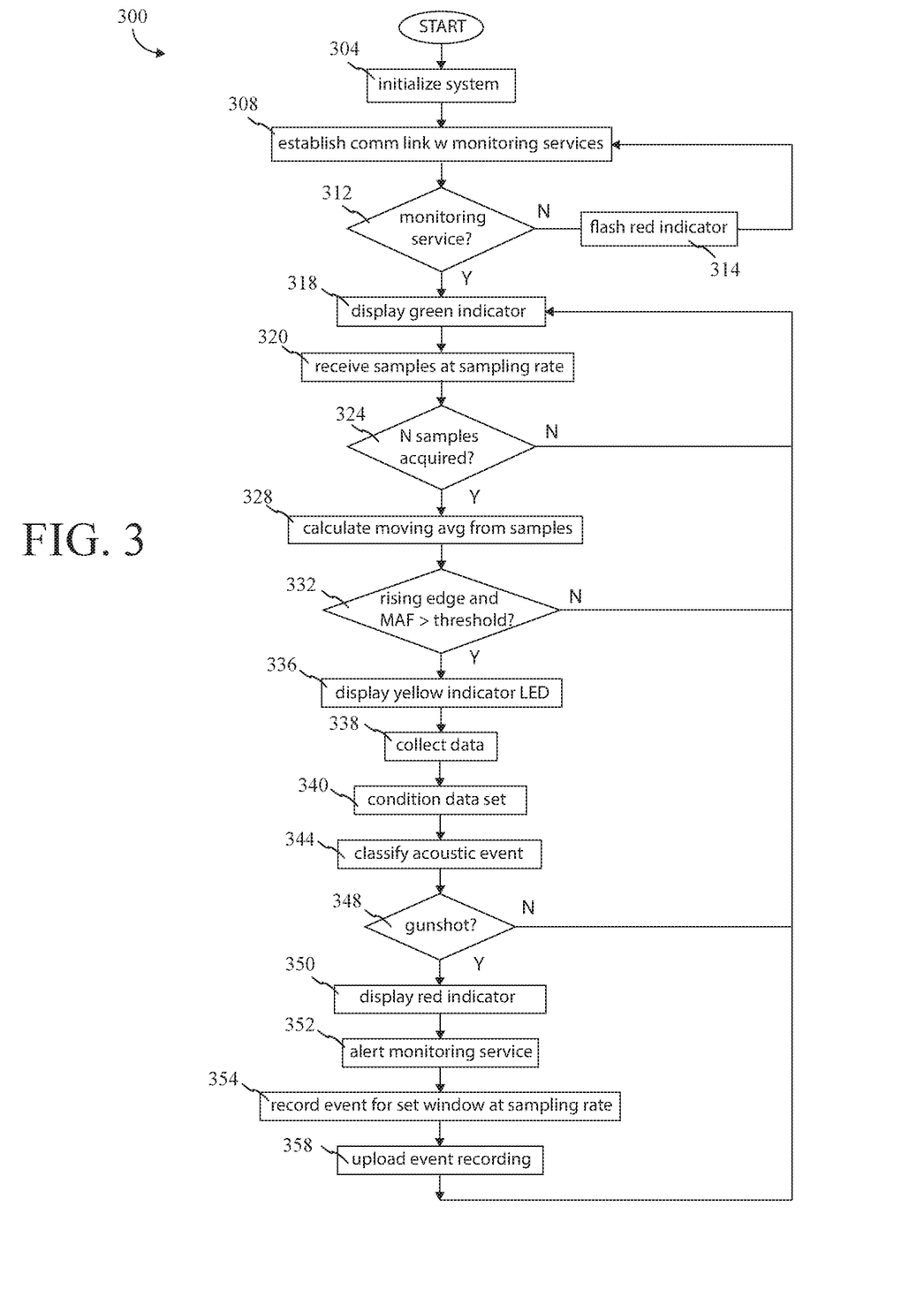
FIG. 3 is a flow chart illustrating an embodiment for sensing an acoustic event using an acoustic sensing device, in accordance with one or more aspects and implementations described herein.

Turning now to FIG. 3, shown is a flowchart that provides an example 300 of the operation of an acoustic sensing device, such as acoustic sensing device 108, in relation to gunshot monitoring and reporting functionality, according to various embodiments described herein. Note that embodiments of devices described herein, such as device 108, are described in the general context of processor-executable instructions, such as program modules, stored in non-volatile memory (e.g. memory 220) executed by one or more processors (e.g., processor 216), wherein the program modules may generally comprise routines, scripts, programs, objects, components, data structures, and so on that perform particular tasks or implement particular abstract data types. In general, the program modules may take any suitable form (e.g., scripted vs compiled code), depending on the implementation, and any implicated ancillary software components or environments are to be understood as included within the implementations described herein. Typically, the functionality of the program modules may be combined or distributed as desired in various embodiments herein, and it should be understood that the particular ordering of the steps illustrated in FIG. 3 is not intended to be limiting to the operation of the acoustic sensing device 108, or to preclude additional and/or other substituted functional steps being utilized.

With reference to FIG. 3, at steps 304 and 308 the device is initialized, and a communication link is established with the remote monitoring station 120 by, for example, executing a pre-defined handshake routine. At step 312, device 108 determines whether a link has been established and, if not, loops back and retries to establish communication at block 308. In one or more embodiments, device 108 may display a suitable status indicator (e.g., flash a red LED) at step 314 to signal an error if it is determined that no link has been established. In one or more embodiments, the device may timeout and stop once a predefined number of attempts have been made.

Once the communication link is established, the device receives acoustic samples at block 320. Generally, and with reference to FIG. 2, microphone 204 functions to convert sound waves detected from its associated coverage area (e.g., coverage area 104) to an electrical signal, which is amplified and filtered by signal processing circuitry 208 and then fed to ADC 212, where it is converted to a digital acoustic signal. This digital acoustic signal is sampled in a finite length buffer 244, which effectively operates as a circular buffer (i.e., when the buffer is full, new data overwrites the oldest data). In one non-limiting embodiment, the buffer may store 0.1 seconds worth of data and the digital acoustic signal may be sampled at 44.1 kHz, which results in 4410 samples being stored per buffer. When the device 108 is operating, the digital acoustic signal is continuously being generated and sampled in the buffer. In one or more embodiments, device 108 displays a suitable status indicator (e.g., green LED) at block 318 as it receives acoustic samples.

At step 324, device 108 determines whether a pre-defined number, N, of samples have been acquired and, if not, loops back and continues to receive samples (step 318/320) until N samples are acquired. In one or more embodiments, N is set by number of samples capable of being stored by the buffer (i.e., the effective buffer length). In one preferred embodiment, N is 4410 samples.

If it is determined that N samples have been acquired, at step 328 the sample data is processed to determine whether a candidate event has occurred. In one or more embodiments, at step 328 the processor 216 runs a callback routine (a particular embodiment of a screening module) to process the sample data according to a suitable metric in making the threshold evaluation. In one or more embodiments where N is set by the effective buffer length, this occurs each time the buffer fills with sample data (i.e., each buffer cycle). Also, as will be described more fully below, the sample data is further processed to evaluate whether a candidate event is a candidate gunshot event. Since the buffer fills very quickly, the screening module effectively runs continuously when the detector is operating. Referring to step 328, in one or more non-limiting embodiments, the screening module calculates a moving average from the sample data. In some embodiments, this means that the screening module applies a moving average filter to buffer data in in order to reduce random noise, while retaining a sharp step response.

At step 332, the screening module evaluates whether both the threshold metric of step 328 (e.g., the moving average) meets a configured condition (e.g., a parameter) and whether the sample data satisfies a configured secondary condition to qualify the event as a candidate gunshot event. In one or more embodiments, the secondary condition is a rising edge condition. In some embodiments, the screening module performs both the threshold metric process and the secondary condition evaluation (e.g., the rising edge evaluation). With respect to the threshold metric, in one or more embodiments the screening module compares the filtered buffer data to a threshold value, T (stored in non-volatile memory 220), to determine if it exceeds the threshold value. In the rising edge evaluation, the screening module determines whether the threshold-exceeding event is immediately preceded by a large jump from a low value to a high value. If the filtered buffer data exceeds the threshold value and has a rising edge, it is determined that a candidate event has occurred, and the process proceeds forward to step 336. If not, device 108 continues to receive acoustic sample data as before at step 320.

In general threshold value, T, may be pre-set and selected based on one or more factors including, for example, the type of acoustic environment in which the detector is installed. For example, the threshold value may be higher if the coverage area (e.g. coverage area 104) is a location that is typically noisy, such as a bar or restaurant, rather than in a location that is typically quiet, such as a library. By selecting an appropriate value for T that is tailored to the acoustic environment where the device is installed, the device 108 may be "tuned" to help make more accurate identification of gunshot events.

In one or more embodiments, threshold value T may be set or configured in device 108 in a number of different ways. For example, threshold value T may be set by selecting one of a limited number of preselected options (values), based on the noise level of the location, such as low (quiet), medium, or high (noisy). The selection may be done, for example, through a mechanical interface on the device 108, such as through one or more switches (dipswitches or other), or through a local I/O via a peripheral such as an external USB keypad (not shown), or remotely through the communication interface 228 over a network connection. In addition, in some embodiments, the selection may be done by a user after purchase and installation of the detector, or may be done by the supplier of the detector pursuant to information provided by the user at the time of purchase, using primary application 136, or otherwise.

With reference to FIG. 3, if a determination is made at step 332 that a candidate event has occurred, device 108 performs data collection at step 338 and a waveform analysis using the collected data to determine a probability, p, that a candidate event is a gunshot. In general, a suitable waveform analysis for the embodiments herein may include any analysis that incorporates machine learning factors and that is capable of determining with increased accuracy a probability, p, that a candidate gunshot event is a reportable gunshot event. In FIG. 3, the waveform analysis step is described in relation to a particular non-limiting embodiment by steps 340 and 344—two constituent sub-steps of one or more embodiments described separately below, wherein step 340 indicates the step of conditioning the received sample data and step 344 is directed to operating on the conditioned data using a classifier routine (a particular embodiment of intelligent module 240, referenced below). In one or more embodiments, the device 108 displays a suitable status indicator (e.g. yellow LED) at step 336 if a determination is made at step 332 that a candidate event has occurred.

Referring to FIG. 3, at step 338 the device 108 starts a counter for counting buffer (FIG. 2) cycles and timestamps and records buffer data concerning the candidate event in non-volatile memory. More specifically, upon a determination at step 332 that a candidate event has occurred, filtered data from the preceding buffer cycle and data from a predetermined number of current and subsequent buffer cycles (as counted by the counter) are timestamped and recorded, unless sooner terminated by a subsequent candidate event. Thus, in one or more embodiments, the data that is recorded comprises filtered data generated prior to, during and subsequent to the occurrence of the candidate event. In one non-limiting embodiment, the predetermined number of current and subsequent buffer cycles is eleven, which, together with the preceding buffer cycle, brings the total number of buffer cycles to twelve. If the buffer stores 0.1 seconds of data, the recording of data for 12 buffer cycles comprises 1.2 seconds of recorded data. According to the non-limiting embodiment described more fully below, this 1.2 seconds is trimmed from the front and back to obtain a total of 1.1 seconds of data.

In one or more embodiments, while the counter is running, and data is being recorded in non-volatile memory, the screening module continues to analyze buffer data to determine if another candidate event occurs. If the counter runs out (i.e., reaches the predetermined number of buffer cycles) and another candidate event is not determined to have occurred, the recorded data is conditioned and sent to/made available to intelligent module 240 for analysis. If, however, another candidate event is determined to have occurred (while the counter is running), a repeat event flag is set, the recording of data for the first candidate event is terminated and the data recorded for the first candidate event is saved. In addition, the counter is restarted and filtered buffer data is timestamped and recorded for the second candidate event. If still another candidate event is determined to have occurred (while the timer is again running), the repeat event flag is set again, the recording of data for the second candidate event is terminated, the data recorded for the second candidate event is saved, the counter is restarted and filtered buffer data is timestamped and recorded for the third candidate event. The foregoing routine occurs until the counter runs out for a candidate event (i.e., there is a full data period), at which point, all of the data that has been saved is conditioned and sent to/made available to intelligent module 240 for analysis.

As briefly described above, and in general, intelligent module 240 may comprise one or more software components or code (e.g. related functions, routines), that incorporate or otherwise embody one or more parameters, constants, equations, functions, or models, that have resulted from applying machine learning technique(s) on one or more data sets obtained or derived from actual events relevant to the acoustic event being monitored (e.g., gunshots). In one preferred embodiment, intelligent module 240 comprises a trained logistic regression model, applied to a conditioned data set, and referenced herein as the classifier routine. Unless context dictates otherwise, the terms "intelligent module 240" and "classifier routine" may be used interchangeably hereinafter.

In the foregoing process of detecting candidate events and recording data, a running log is kept of candidate events that are detected. The log is stored in non-volatile memory 220 and may include a textual notation and/or a timestamp for each candidate event that has been detected. The textual notation may include an indication that the candidate event is a repeat event. In one or more embodiments, the timestamps for the log and the recorded data is UNIX epoch time, wherein each timestamp may be a 10-digit UNIX epoch time representation for resolution in seconds or a 13-digit UNIX epoch timestamp for millisecond resolution. It should be understood that the embodiments described herein are not limited to the aforementioned manner of collecting and recording event data, and in general any suitable manner of collecting and recording event data may be utilized in the embodiments disclosed herein.

As may be understood from the above-description, the data set that is recorded for each candidate event represents a time domain signal or waveform. In one or more embodiments, the data sets are conditioned at step 340 before they are sent to/made available to intelligent module 240 for analysis. With respect to step 340, the conditioning of the data set includes detrending and rescaling and, for a partial data period, zero-padding. First, the data set for a candidate event is detrended to remove the presence of any trend, i.e., a change in the mean over the time period of the data set. Next, if the recorded data set is not for a full data period (i.e., its collection was interrupted by a subsequent candidate event), the recorded data set is supplemented with zeroes, i.e., is zero-padded, so as to have the length of a full data period. Finally, the recorded data set is rescaled, which may include trimming and setting the time scale of the candidate event.

In most embodiments, the amount of data recorded for a full data period is more than the amount used by the classifier routine of step 344, described more fully below. In the embodiment described above, 1.2 seconds of data is recorded for a full data period, while 1.1 seconds of data is used by the classifier routine. Accordingly, 0.1 seconds worth of data is trimmed from the front and back of the recorded data to arrive at a trimmed data set. More specifically, data recorded more than 0.1 seconds before the candidate event is removed and data recorded more than 1 second after the candidate event is removed. The time scale of the trimmed data set is then set so that the candidate event is assumed to have occurred at time t=0.

In general, the conditioning step 340 comprises putting the data sets into a uniform format, which facilitates their subsequent analysis by intelligent module 240 (e.g., the classifier routine of step 344) and helps in the training of the intelligent module 240. Conditioning also helps intelligent module 240 focus on nonrecurrent fluctuations in the data, which is where the fingerprint of a gunshot may be found. It should be understood, however, that the embodiments described herein are not limited to the aforementioned manner of conditioning recorded event data, and in general any suitable manner of conditioning the data may be utilized in the embodiments disclosed herein.

With continuing reference to FIG. 3, at step 344 the classifier routine begins with extraction of time and frequency domain features of a conditioned data set. The time domain feature is extracted by first estimating the amplitude envelope of the conditioned data set, which may be done by rectifying the data set (waveform) and then low-pass filtering it. The amplitude envelope is then down-sampled to obtain Nt time domain points. The frequency domain feature is extracted by computing a discrete Fourier transform (DFT) of the data set using a fast Fourier transform (FFT) algorithm and then linearly binning the DFT into Nf frequency domain points across a subset of the resolvable bandwidth (by default, 0<f<22 kHz). The foregoing extraction of time and frequency domain features results in a total feature space (time domain points and frequency domain points) of dimension N=Nt+Nf. Since N may typically be rather large for a data set (e.g., from 100 to 1000), in one or more embodiments, a principal component analysis (PCA) is used to reduce the feature space to a smaller dimension space, while retaining the majority of the variance in the data (by default N>Nsub=25).

With continuing reference to step 344, the probability, p, of a gunshot is predicted by applying a classification routine to the feature vector, X, obtained from the conditioned data set, as just described. In one or more specific embodiments, the classification routine comprises a trained logistic regression model, applied to the feature vector as:

$$p = z(A'*X) \quad (1)$$

where ' indicates the vector transpose, A is a set of model weights derived from training the model on a known dataset, and z is the sigmoid function:

$$z(x) = \frac{1}{1+e^{-x}}. \quad (2)$$

The model weights may be obtained using any suitable machine learning methodology on any number of suitably relevant data sets sufficient to produce the desired results (identification of gunshots with increased accuracy and low numbers of false positive identifications). In one or more embodiments, the model weights are obtained using stochastic gradient descent on one or more data sets obtained using actual gunshot acoustic event data.

At step 348, device 108 determines that if the probability, p, is greater than a predetermined threshold probability (which by default may be set to 0.5), then the candidate event is considered to be a gunshot event. Furthermore, in one or more embodiments, when more than one candidate event is identified in a series of candidate events (i.e., when multiple gunshots are fired close in time in a covered area 104), as previously described, the probability, p, is calculated for the conditioned data set of each candidate event. In that scenario, the greatest value of the set of probabilities is selected in step 348 to determine whether a gunshot event has occurred. For example, if three repeat candidate events occur and three probabilities of 0.4, 0.4 and 0.6 are calculated for them, respectively, the 0.6 probability will be selected. If the predetermined threshold probability is set to 0.5 (as described above), the selection of the highest probability in this set results in a determination by device 108 that a gunshot has occurred.

With reference to FIG. 3, in one or more embodiments the device 108 displays a suitable indicator LED (e.g. red LED) at step 350 if a determination is made at step 348 that a gunshot has occurred.

If a gunshot is determined to have occurred in step 348, then device 108 sends a detection alert/signal immediately to the remote monitoring station over network 116, via communication interface 228. In addition, for a predetermined period of time, T, filtered data from the buffer is continuously stored in non-volatile memory 220 at step 354. This stored data may be used for later analysis of the gunshot event and/or further training of the intelligent module 240 (e.g. for obtaining coefficients used in the classifier routine of step 344). In one or more embodiments, at step 358 the stored event data is uploaded automatically to the remote monitoring station over network 116. In other embodiments, the stored event data may be manually collected and uploaded or uploaded upon command from one or more of the remote monitoring station or application primary application 136. In one or more embodiments, device 108 stores the determination of a gunshot event in a log stored in non-volatile memory 220.

In one or more embodiments of system 100 disclosed herein, when remote monitoring station 120 receives a detection alert/signal from an acoustic sensing device 108, security and/or emergency medical service (e.g., EMS/EMT) personnel are immediately notified and may be promptly dispatched to the coverage area 104 where the detector is located. Alternately, or in addition, the detection signal may also be forwarded to a police station located close to the coverage area 104 where the detector is located.

Figure 4:
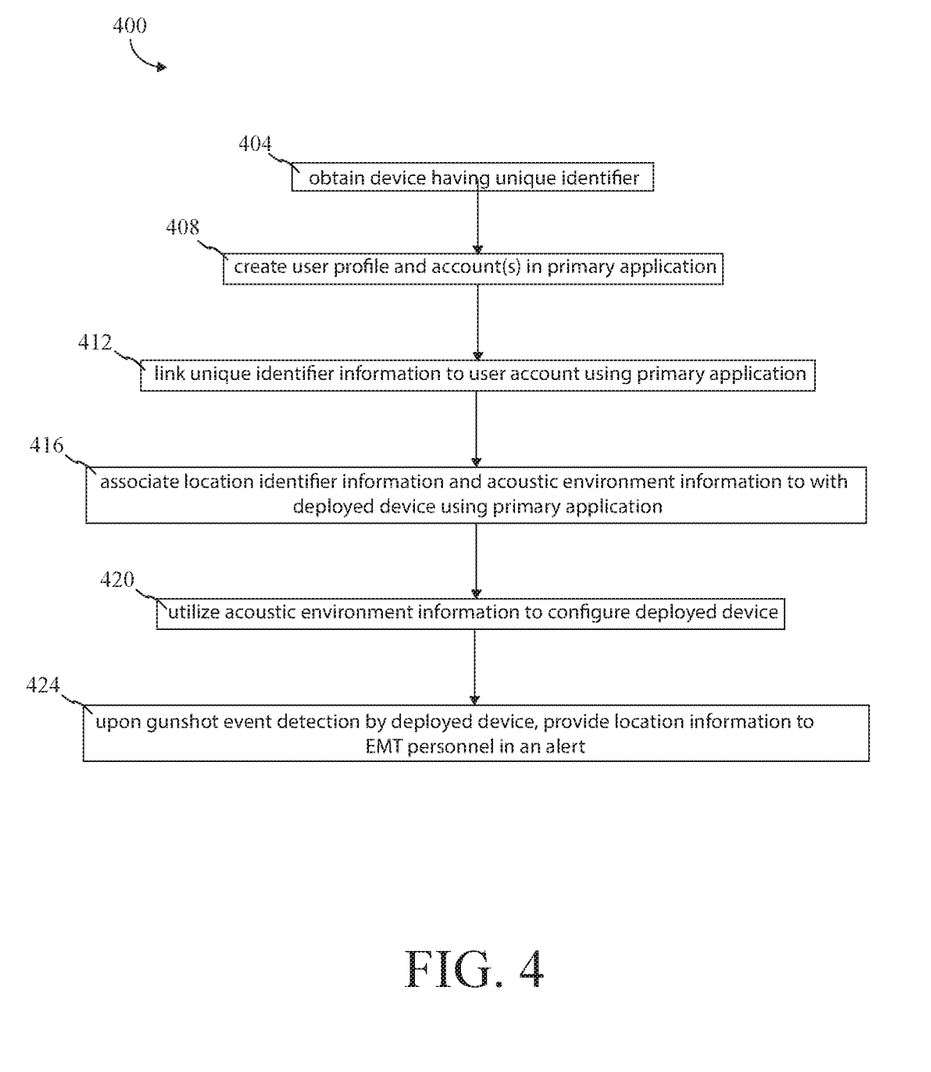
FIG. 4 is a flow chart illustrating a method of detecting a gunshot and alerting a remote monitoring station, in accordance with one or more aspects and implementations described herein.

Turning now to FIG. 4, a method to detect gunshots 400 is shown and described. Initially, at step 404 a user (e.g. a consumer or other user who purchases or licenses one or more devices) obtains a device 108. In one or more embodiments herein, device 108 has at least one unique identifier, such as for example the MAC address of communication interface 228 (e.g., cellular network adapter, WiFi adapter, etc.) (see FIG. 2) or a unique alphanumeric value stored in non-volatile memory 220.

At step 408, the user logs into or otherwise connects to primary application 136 (FIG. 1) using a client device 140 in data communication with application 136 over network 144. Using client device 140, the user creates a user profile (e.g., one or more records containing user information stored in database 152), if no prior user profile information is stored in database 152, and creates one or more user accounts and/or sub-accounts in primary application 136. In general, a user account may comprise any account information and architecture suitable for use in the systems described herein. In one or more embodiments, user accounts may be established as one or more records, tables, documents, etc. that are keyed to the user and stored in database 152. In one or more embodiments, sub-accounts may be established that are keyed to main accounts for a user, wherein each sub-account is also keyed or otherwise linked to one device 108. In general, the use of sub-accounts or similar architecture may allow for a single user to link multiple devices to the user (e.g., to user profile information) in primary application 136.

At step 412, the user links unique identifier information of device 108, referenced above in step 404, to the account and/or sub-account using primary application 136. This may be accomplished in any suitable manner. For example, the user may enter unique identifier information into a record keyed to or otherwise associated with the account and/or sub-account. Having linked the unique identifier information to the user account and/or sub-account, the device may be physically deployed at a location. For example, a user may mount device 108b to the gas station facility shown in FIG. 1 and (if applicable) connect device 108b to a power source (e.g., a 120V standard U.S. electrical outlet). For the sake of clarity, device 108b as deployed in this example may hereinafter be referenced as the deployed device.

At step 416, the user associates location identifier information with the deployed device in application 136. In general, the location identifier information comprises a street address or other information that uniquely identifies the physical location where device 108 is deployed and/or a location in close proximity to the location where device 108 is deployed. For example, in the deployment shown in FIG. 1 for device 108b, location identifier information could comprise the street address of the gas station, and in some embodiments could also comprise an indication that the device is in the outside front area adjacent the gas station building). In some embodiments, the user may also associate acoustic environment information relating to the aforementioned location with the device 108 in application 136. In general, acoustic environment information may be any suitable information capable of characterizing or otherwise be indicative of the acoustic environment in which the device 108 is deployed. The association of such information may be accomplished in generally any suitable manner. For example, application 136 may be configured such that the location identification information and environment information (if any) is stored in database 152 in one or more records, documents, tables, etc. that are associated with device 108.

In one or more embodiments, at step 420, the device 108 is configured to reflect the environment information stored in application 136 and associated with the device. In some embodiments, the configuration step comprises updating or otherwise setting the threshold value, T, on the device using the acoustic environment information.

At step 424, when a gunshot occurs in a covered area (e.g., gunshot 156 in covered area 104b) (FIG. 1) and is detected by a deployed device (e.g., device 108b), a gunshot alert is sent to remote monitoring station 120 (FIG. 1) by device 108b, wherein the alert may contain information comprising device unique identifier information. Using the unique identifier information, monitoring station 120 (autonomously or via human interaction) may use the unique identifier information to request and/or determine user and location information associated with the deployed device. In one or more embodiments, remote monitoring station 120 may directly access user and location information stored in database 152. In other embodiments, remote monitoring station 120 may access information derived from the user and location information stored in database 152 (e.g., a locally hosted copy or derivation of such information) to request and/or determine user and location information associated with the deployed device. Having retrieved location information for the deployed device, remote monitoring station 120 may issue an alert to EMT personnel indicating that a gunshot has been detected, and providing the retrieved location information.

Figure 5:
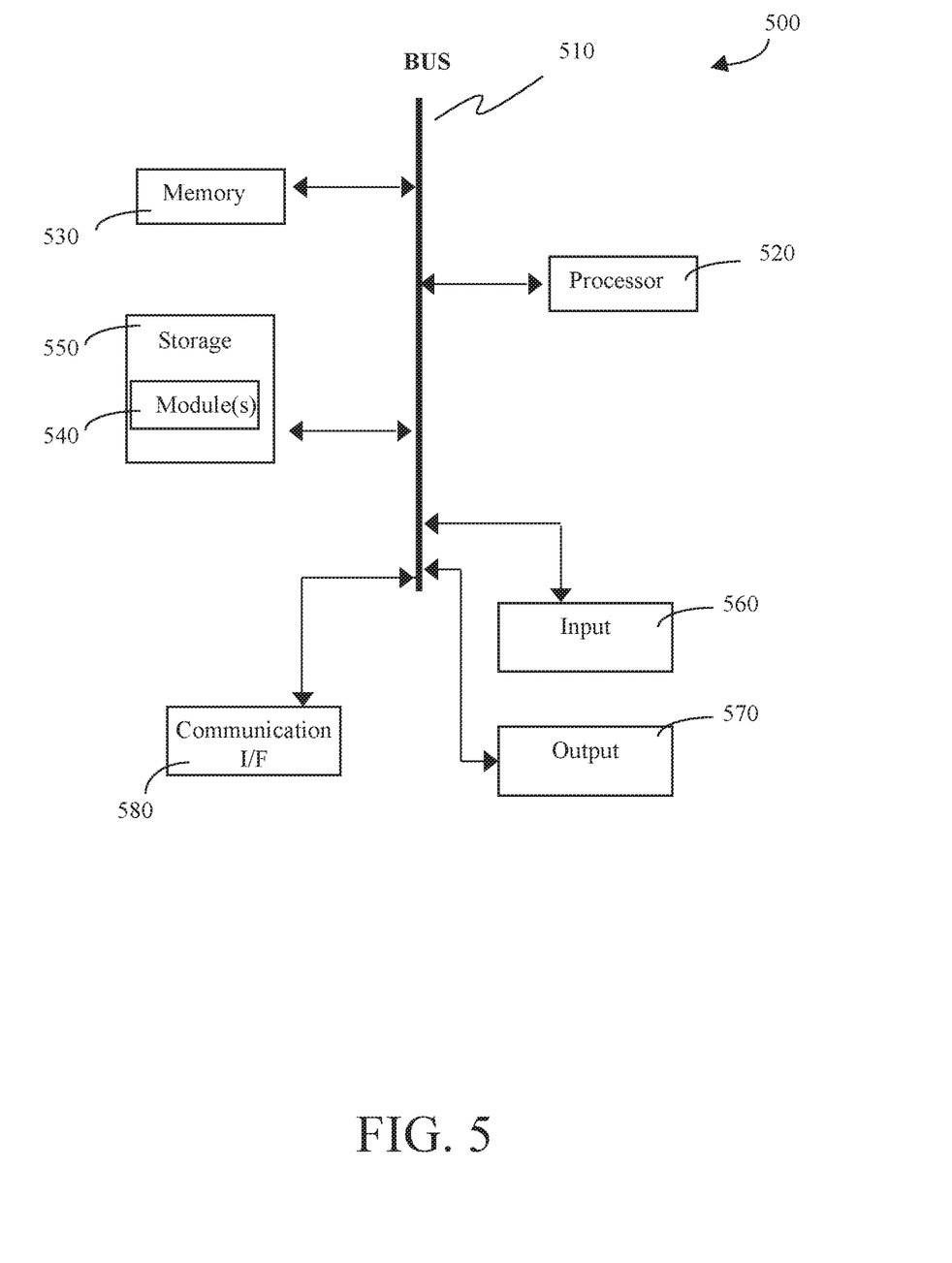
FIG. 5 is a block diagram illustrating an exemplary computing system in which various aspects of the present disclosure may be implemented.

Turning to FIG. 5, illustrated is a logical arrangement of a set of general components of a basic general purpose system or computing device 500 (for example, a general purpose computer) which may be employed to practice one or more of the embodiments, or one or more components in one or more of the embodiments, of the present disclosure. System bus 510 ties system components including system memory 530 (e.g., ROM and/or RAM) to processor 520. System bus 510 may generally be any suitable type of bus structure using any suitable bus architecture, such as for example, a memory bus or controller, a peripheral bus, or a local bus. Information transfer to/from the bus (and components) may be accomplished by any suitable means, such as for example a BIOS stored in ROM 530 or the like. System memory 530 may include other and different types of memory than ROM/RAM. Computing device 500 may have more than one processor 520 or may comprise a group or cluster of computing devices 500 networked together to provide greater processing capacity. Processor 520 may include any general-purpose processor, with or without one or more hardware or software modules 540 stored in storage 550, configured to control processor 520, as well as any special-purpose processor. Computing device 500 may include storage 550 (e.g., flash drive, hard disk drive, magnetic or optical disk drive, or the like). Storage 550 may include one or more software modules 540 for controlling processor 520. In general, the drives and the associated non-transitory computer readable storage media provide nonvolatile storage of computer readable instructions, data structures, program modules and data for computing device 500. A person of ordinary skill in the art would know how to make variations to the basic components described to suit a particular function or need. Non-transitory computer-readable storage media expressly exclude media such as energy, carrier signals, electromagnetic waves, and signals per se.

With continuing reference to FIG. 5, computing device 500 may comprise input device 560 and output device 570. In general, input device 560 may be any number of input means, such as a microphone for speech, a touch-sensitive screen for gesture or graphical input, a keyboard, mouse, and the like. Also in general, output device 570 may any number of output means, such as for example a visual monitor (LCD, CRT, etc.), a printer, and the like. Communications interface 580 generally governs and manages the user input and system output. A person of ordinary skill in the art would know that the basic features described here may easily be substituted for improved hardware or firmware arrangements as they are developed.

The exemplary system of FIG. 5 is illustrated as including individual functional blocks. In general, the functions represented by these blocks may be provided through the use of either shared or dedicated hardware, including but not limited to, hardware capable of executing software and hardware that is purpose-built to operate as an equivalent to software executing on a general purpose processor. Some embodiments may include general processor, microprocessor and/or digital signal processor (DSP) hardware, read-only memory (ROM) (e.g., memory 530) for storing software performing the operations described herein, and random access memory (RAM) for storing results. Logical operations of various embodiments described herein may be implemented as, for example, a sequence of computer implemented steps, operations, or procedures running on a processor or processing resource within one or more general or specific-use computers. System 500 may practice all or part of the recited methods, may be a part of the recited systems, and/or may operate according to instructions in the recited non-transitory computer-readable storage media. Such logical operations may be implemented as modules configured to control processor 520 to perform particular functions according to the programming of the module.

Embodiments within the scope of the present disclosure may also include tangible and/or non-transitory computer-readable storage media for carrying or having computer-executable instructions or data structures stored thereon. Such non-transitory computer-readable storage media may be any available media that can be accessed by a general purpose or special purpose computer. Non-limiting examples may include: RAM, ROM, EEPROM, flash memory or other memory, CD-ROM, DVD or other optical disk storage, magnetic disk storage or other magnetic storage devices, or any other medium which can be used to carry or store desired information (e.g., program code means in the form of computer-executable instructions, data structures, or processor chip design). When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions may include, for example, instructions and data which cause a general purpose computer, special purpose computer, or special purpose processing device to perform a function or group of functions. Computer-executable instructions may also include program modules that are executed by computers in stand-alone or network environments. In general, program modules may include routines, programs, components, data structures, objects, and the functions inherent in the design of special-purpose processors, etc. that perform particular tasks or implement particular abstract data types. Computer-executable instructions, associated data structures, and program modules may represent examples of the program code means for executing steps of the methods disclosed herein. A particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure. We therefore claim as our invention all that comes within the scope of these claims.

We claim:

1. An acoustic sensing device comprising:
    at least one microphone for converting audio signals to electronic signals;
    a housing;
    at least one circuit board connected to the at least one microphone and at least partially disposed in the housing, the at least on circuit board including at least one processor, memory and circuitry for digitizing the electronic signals;
    a buffer for holding sampled data of the digitized electronic signals;
    a wireless communication interface connected to the at least one circuit board and in data communication with the at least one processor;
    a screening module for determining whether the sampled data in the buffer meets threshold criteria for being a candidate event, the threshold criteria being configurable by a user based on the location of the acoustic sensing device; and
    an intelligent module for determining whether a candidate event is a gunshot event and, if so, issuing a gunshot alert using the wireless communication interface; and
    wherein the screening module comprises computer-executable instructions stored in the memory and executable by the at least one processor to perform a screening method comprising:
        filtering the sampled data using a moving average filter to obtain filtered data;
        determining whether the filtered data exceeds a threshold value;
        determining whether the filtered data has a rising edge in which the filtered data jumps from a low value to a high value; and
        determine that a candidate event has occurred if the filtered data exceeds the threshold value and has a rising edge.

2. The acoustic sensing device of claim 1, wherein the buffer is a finite length buffer that operates in a circular manner such that when the buffer is filled, new sampled data overwrites old sampled data.

3. The acoustic sensing device of claim 2, further comprising computer-executable instructions stored in the memory and executable by the at least one processor to perform a data collection method and a data conditioning method.

4. The acoustic sensing device of claim 3, wherein upon a determination that a candidate event has occurred, the data collection method performs steps comprising:
    starting a counter to count cycles of the buffer;

timestamping and recording in the memory sampled data in the buffer from a cycle of the buffer occurring before the occurrence of the candidate event;

timestamping and recording in the memory sampled data in the buffer from a cycle of the buffer occurring during the candidate event; and timestamping and recording in the memory sampled data in the buffer from a predetermined number of cycles of the buffer occurring after the candidate event.

5. The acoustic sensing device of claim 4, wherein the data conditioning method comprises:

detrending the recorded sampled data to remove the presence of any trend and thereby produce detrended data; and rescaling the detrended data to form conditioned data.

6. The acoustic sensing device of claim 5, wherein the intelligent module comprises computer-executable instructions stored in the memory and executable by the at least one processor to perform a classifier method comprising:

extracting time and frequency domain features of the conditioned data to obtain a total feature space comprising time domain points and frequency domain points;

performing principal component analysis on the total feature space to obtain a smaller dimension space having a vector X;

applying a trained logistic regression model to the vector X to obtain a probability p of a gunshot pursuant to the relationship p=z(A'*X), where ' indicates the vector transpose, A is a set of model weights and z is the sigmoid function: $z(x)=1/(1+e^{-x})$;

and determining that a gunshot event has occurred if the probability p is greater than a predetermined threshold probability.

7. The acoustic sensing device of claim 6, wherein the screening module continues to run after a candidate event has been determined to have occurred.

8. The acoustic sensing device of claim 7, wherein the screening module is operable to determine that a plurality of candidate events has occurred.

9. The acoustic sensing device of claim 8, wherein if a plurality of candidate events has been determined to have occurred, the intelligent module calculates a probability p for each of the candidate events, and wherein the intelligent module selects the greatest of the calculated probabilities p and compares it to the predetermined threshold probability to determine whether a gunshot event has occurred.

* * * * *